United States Patent [19]

Jones et al.

[11] Patent Number: 5,644,334

[45] Date of Patent: Jul. 1, 1997

[54] STATUS INDICATORS OF AN IMPROVED GRAPHICAL USER INTERFACE

[75] Inventors: Jeremy A. Jones, Arlington; Neil L. Mayle; Paige K. Parsons, both of Cambridge; Andrew L. M. Shalit, Somerville; Steven H. Strassmann, Cambridge, all of Mass.

[73] Assignee: Apple Computer, Inc., Cupertino, Calif.

[21] Appl. No.: 613,530

[22] Filed: Mar. 11, 1996

Related U.S. Application Data

[63] Continuation of Ser. No. 245,877, May 19, 1994, abandoned.

[51] Int. Cl.$^6$ ........................................ G09B 1/06
[52] U.S. Cl. ..................... 345/119; 345/127; 345/157; 395/326; 395/340
[58] Field of Search ..................... 345/146, 118, 345/119, 120, 112, 127, 131; 395/155, 156, 157, 139

[56] References Cited

U.S. PATENT DOCUMENTS

| Re. 32,632 | 3/1988 | Atkinson | 345/146 |
|---|---|---|---|
| 4,278,973 | 7/1981 | Hughes et al. | 345/120 |
| 4,622,545 | 11/1986 | Atkinson | 345/191 |
| 4,831,556 | 5/1989 | Oono | 345/119 |
| 4,881,179 | 11/1989 | Vincent | 345/118 |
| 4,888,712 | 12/1989 | Barkans et al. | 345/118 |
| 4,931,783 | 6/1990 | Atkinson | 345/146 |
| 5,065,347 | 11/1991 | Pajak et al. | 395/159 |
| 5,339,391 | 8/1994 | Wroblewski et al. | 345/157 |

OTHER PUBLICATIONS

IBM Technical Disclosure Bulletin, vol. 35, No. 7, Dec. 1992 New York, pp. 285–286, Selecting of Usable Font Size for the Host Sessions.
IBM Technical Disclosure Bulletin, vol. 34, No. 7A, Dec. 1991 New York, pp. 431–433, Providing a User Customized Details View.
Patent Abstracts of Japan, vol. 018 No. 587 (P1824), 10 Nov. 1994, & JP,A,06, 215095 (CSK Corp.) 5 Aug. 1994.
Guide to MacApp Tools, Developer Technical Publications, Apple Computer, Inc. 1992, pp. 1–162.
Languages for Developing User Interfaces, A Component Architecture for Personal Computer Software, Smith et al., pp. 31–56.
Desktop Sparc, Sun Systems User's Guide, Copyright 1990, Sun Microsystems, Inc., p. 143.

*Primary Examiner*—Kee M. Tung
*Assistant Examiner*—Doom Chow
*Attorney, Agent, or Firm*—Cesari and McKenna

[57] ABSTRACT

An improved graphical user interface comprises novel status indicators pertaining to state attributes associated with objects displayed on a display screen of a computer system. These status indicators are preferably portrayed on a window pane of a display screen as distinct visual cues and are located adjacent to their associated objects to provide a customizable browser framework to a user. A dynamically-adjustable side bar panel provides a designated area within each pane for displaying the status indicators.

16 Claims, 10 Drawing Sheets

STATUS INDICATORS OF AN IMPROVED GRAPHICAL USER INTERFACE

This is a continuation of U.S. patent application Ser. No. 08/245,877, filed on May 19, 1994, now abandoned.

CROSS-REFERENCE TO RELATED APPLICATIONS

This invention is related to U.S. patent application Ser. No. 08/246,319, titled ASPECT AND STYLE ELEMENTS OF AN IMPROVED GRAPHICAL USER INTERFACE, filed on May 19, 1994 and assigned to the assignee of the present invention. The invention is also related to U.S. patent application Ser. No. 08/050,510, titled INTERACTIVE USER INTERFACE, filed on Apr. 20, 1993 and assigned to the assignee of the present invention, which application is hereby incorporated by reference as though fully set forth herein.

FIELD OF THE INVENTION

This invention relates to interactive user interfaces for computer systems and, more specifically, to status indicators of a customizable browser framework for an improved graphical user interface.

BACKGROUND OF THE INVENTION

Graphical user interfaces are typically based on bit-mapped graphic display technology that employs iconic (pictorial) representations, multi-font typographic-style text and other art work on a display screen of a computer system. These interfaces include a window environment that configures the screen to resemble a graphical display for a user to enter or view information. Generally, an application program executing on the computer system presents the information to the user through a window by drawing images, graphics or text within the window region. The user, in turn, communicates with the application by "pointing" at objects in the window with a cursor that is controlled by a hand-operated pointing device, such as a mouse.

Transient "pop-up" or "pull-down" menus list command selections that are available to the user at all times, regardless of what else may be displayed on the screen. For example, there is no need to close a document and return to a main menu screen in order to select and issue commands from a menu. The menus can be activated and commands selected merely by pointing to them with the mouse. That is, the commands may be issued by actuating the mouse to move the cursor onto or near the command selection and pressing and releasing, i.e., "clicking", a button switch on the mouse.

In general, these menus may be manifested as direct access menus which show all possible choices on a window, such as with a panel of buttons, or as taxonomic menus which classify a domain hierarchy and allow the user to navigate through it. In many situations it is not necessary for the menu to remain permanently visible on the display screen and it can thus be "popped-up" on the screen when required. Typically, a button switch on the mouse is depressed to display the menu which is then painted on the screen near the cursor position. When the switch is released, the menu disappears. Again, menu selection is achieved by pointing the cursor at the desired item with the mouse, which visually shades the selected item.

The pop up menu is a convenient way to keep frequently used commands and information accessible without occupying space on the window. Alternately, several different menus can be provided by buttons on the window which, when selected by the mouse, display their menus; these are called pull-down menus. Typically, these menus remain drawn only while the mouse button is depressed.

Commands in the pull-down and pop-up menus typically act one or more objects. If an application requires more information to carry out a command, a dialog box may be employed. A dialog box is a special type of window that elicits information from the user, such as requiring the user to check items or fill in blanks.

Graphical user interfaces are exemplified by the Finder application software system used in the Macintosh® series of computers and manufactured by Apple Computer, Inc. of Cupertino, Calif. An aspect of that software system is described in U.S. Pat. No. 4,931,783, which is hereby incorporated by reference as though fully set forth herein. That patent describes how to manipulate and control the functions available from the Finder system though the use of menus. The details of how to implement such a system, as well as other Finder functions, are described in a volume of the publication "Inside Macintosh", published by Addison-Wesley, titled "Macintosh Toolbox Essentials", which volume is also hereby incorporated by reference.

Another example of a popular software system that provides a graphical user interface is the Windows® operating system, which is commercially available from Microsoft Corporation. The present invention is applicable to all such systems and is primarily concerned with accessing information relating to the states of objects developed in accordance with object-oriented programming techniques.

Object-oriented programming is a paradigm for designing and implementing software programs. Generally, object-oriented programming defines and packages objects, where an object consists of a data structure together with the operations available for that structure. Once such objects have been defined, it is possible to build a program as a simple sequence of processes to be performed on specified instances of these objects. An integral part of object definition is the ability to create new, more elaborate objects as enhancements of those previously defined.

When developing software programs, there may be attributes associated with one or more of these objects that a user, such as a programmer, would like to examine. These attributes may relate to numerical values or information concerning the status of an object, such as whether its source code has been modified. Typically, the attributes are represented as bits of state associated with the object and, in many conventional graphical user interface systems, these state attributes are available from menus accessible from a window. However, the programmer retrieves the menu and accesses each attribute with a control device, such as a mouse, to examine its contents which, typically, are manifested textually. Such procedures may be time consuming and inefficient, particularly if there are many different state attributes associated with the object.

Accordingly, it is among the objects of the present invention to provide an improved graphical user interface having the capability of positionally representing state attributes associated with an object.

Another object of the present invention is to provide an interactive graphical user interface having the capability of positionally displaying state attributes for more than one object at a time.

SUMMARY OF THE INVENTION

Briefly, an improved graphical user interface in accordance with the invention comprises novel status indicators pertaining to state attributes associated with objects displayed on a display screen of a computer system. These status indicators are preferably portrayed on a portion of a window, called a pane, of a display screen as distinct visual cues that are located adjacent to their associated objects, thereby providing a customizable browser framework to a user, such as a programmer. Examples of object-related attributes represented by the status indicators include, among others, whether the source code of an object has been saved or compiled, and an indication of its user access/ protection status, e.g., read-only.

Specifically, a bar panel is provided along a predetermined side (i.e., right/left, top or bottom) of each window pane for displaying the status indicators. According to one aspect of the invention, the status indicators may be distinguished from among one other by color, shape and/or relative spatial position along this side bar panel. In an illustrative embodiment, each type of indicator has a different color and a different location along the width of the panel, while assuming a rectangular, "blip-like" shape that is common among all indicator types.

In accordance with another aspect of the invention, the width of the side bar panel dynamically expands/contracts depending upon the quantity of status indicators chosen for display. The dynamically adjustable nature of the side bar panel allows numerous status indicators to be shown on the panel, if desired, while also conserving screen real estate when only a few indicators are selected for display.

Moreover, use of positional status indicators, each having a distinct color, shape and/or spatial position within the side bar panel of a pane, obviates the need for a user to read text associated with each indicator. This is particularly significant for a programmer that may be interested in the status of various objects during software development in a programming environment. By eliminating the need to read text to determine the status of these objects, the programmer can merely glance at the visual cues and off-load interpretation of their states to the subconscience, thereby eliminating time consuming and inefficient computer-related commands.

Operationally, the types of indicators portrayed on the screen for an object are preferably determined on a pane-by-pane basis by retrieving a status indicator dialog box for that pane from a pull-down menu or through other means such as double clicking the mouse in the side bar region of a pane. The dialog box is a user interface element that provides a list of available status indicator entries, including those that are currently being displayed; these latter indicators are so designated by check marks or other inscription adjacent to the entries. A user may select or deselect any of the available status indicators on the list for a pane by, for example, "clicking" on the indicator entries with a mouse.

The selected status indicators are stored in a data structure located within a pane object. These contents of the data structure determine which status indicators will be displayed in the pane which, in turn, determine the width of the dynamically adjustable side bar panel used to accommodate the indicators. These contents are also used to determine the appropriate commands to send to the window manager, which then displays the pane.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
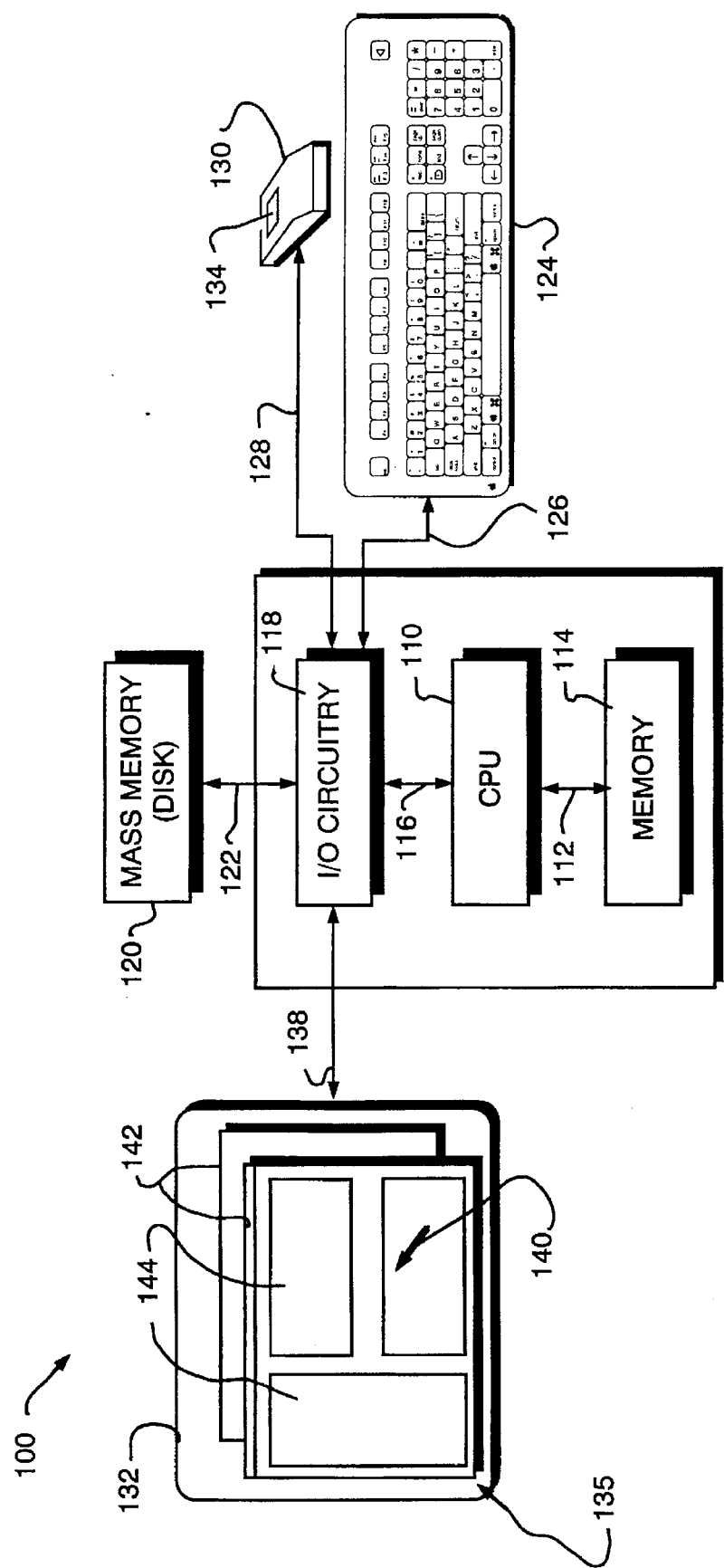
FIG. 1 is a block diagram of a computer system, such as a personal computer system, on which the invention may advantageously operate.

FIG. 1 illustrates a computer system 100 comprising a central processing unit (CPU) 110 coupled between a memory 114 and input/output (I/O) circuitry 118 by bidirectional buses 112 and 116. The memory 114 typically comprises random access memory (RAM) for temporary storage of information, including an application program (not shown), and read only memory (ROM) for permanent storage of the computer's configuration and basic operating commands, such as portions of an operating system (not shown). As described further herein, the application program and operating system interact to control the operations of the CPU 110 and computer system 100.

The I/O circuitry 118 is, in turn, connected to a mass storage unit 120, such as a disk drive, via a bidirectional bus 122 and to cursor control devices, such as a keyboard 124 (via cable 126) and a mouse 130 (via cable 128). A conventional display monitor 132 having a display screen 135 is also connected to I/O circuitry 118 via a cable 138. Specifically, the I/O circuitry 118 receives information, such as control and data signals, from the mouse 130 and keyboard 124, and provides that information to the CPU 110 for storage on the mass storage unit 120 or for display on the screen 135. It is to be understood that the I/O circuitry contains the necessary hardware, e.g., buffers and adapters, needed to interface with the mouse, keyboard and display monitor.

The mouse 130 typically contains at least one button switch 134 operated by a user of the system. A cursor 140 is displayed on the screen 135 and its position is controllable via the mouse 130 or the keyboard 124, as is well known. An example of the mouse 130 is shown and described in U.S. Pat. No. Re. 32,632, which patent is hereby incorporated by reference as though fully set forth herein.

The computer system 100 is preferably a personal computer of the Macintosh® series of computers sold by Apple Computer, Inc., although the invention may also be practiced in the context of any computer. These computers have resident thereon, and are controlled and coordinated by, operating system software, such as the Apple® System/7® operating system.

A window environment is typically displayed on the screen 135. In accordance with an aspect of the invention described herein, the window environment includes windows 142, each of which may contain panes 144, with each pane covering a portion of a window 142. The window environment is generally part of the operating system software that includes a collection of utility programs for controlling the operation of the computer system 100. The operating system, in turn, interacts with an application program to provide higher level functionality, including a direct interface with the user. Specifically, the application program makes use of operating system functions by issuing a series of task commands to the operating system which then performs the requested task. For example, the application program may request that the operating system display certain information on the panes 144 of the display screen 135 for presentation to the user.

The invention herein features, along with these windows and panes, the provision of new user interface elements, such as menus and their entries, which, when invoked, cause actions to take place that enhance the ability of a user to interact with the computer system. This new behavior of the system is brought about by the interaction of these elements with a series of system software routines associated with the operating system. These system software routines, in turn, interact with the application program to create the windows and panes, and manage the new menus, as described further herein.

Figure 2:
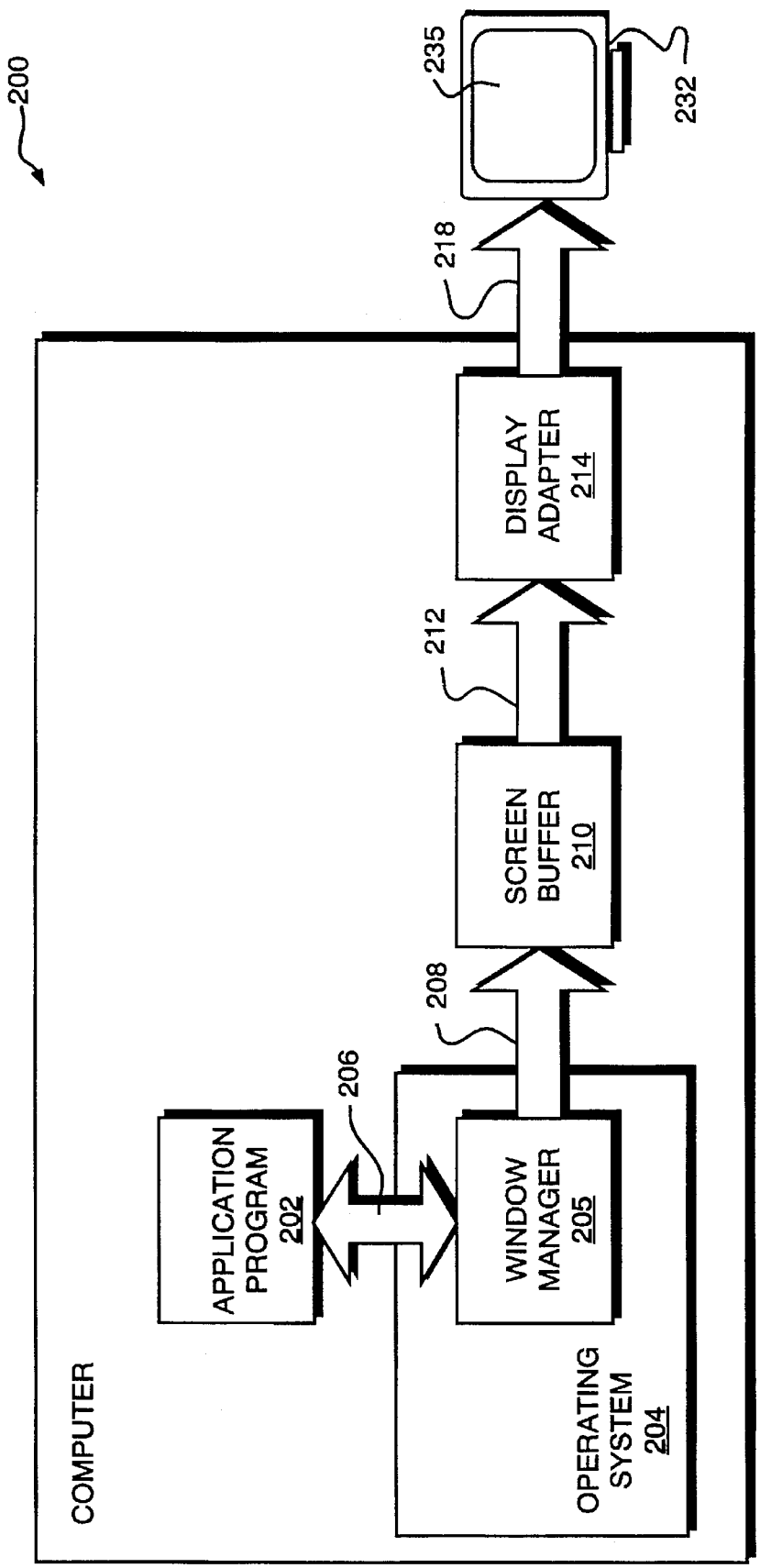
FIG. 2 is a block diagram showing the relationship of an operating system, an application program, a screen buffer and a display screen of the computer system of FIG. 1.

FIG. 2 is a schematic illustration of the interaction of an application program 202 and an operating system 204 of a computer system 200, which is similar to, and has equivalent elements of, the computer system 100 of FIG. 1. The application program 202 and the operating system 204 interact to control and coordinate the operations of the computer 200 and their interaction is illustrated schematically by arrow 206. In order to display information on a screen display 235, application program 202 generates and sends display commands to a window manager program 205 of the operating system 204. The window manager program 205 stores the information directly (via arrow 208) into a screen buffer 210.

The window manager 205 is a system software routine that is generally responsible for managing the windows that the user views during operation of the application program; the application program is generally responsible for managing the panes. That is, it is generally the task of the window manager to keep track of the location and size of the window and window areas which must be drawn and redrawn in connection with elements of the improved graphical user interface of the present invention. Further details relating to the window manager are provided in the aforementioned "Inside Macintosh" publication "Macintosh Toolbox Essentials".

Under control of various hardware and software in the system, the contents of the screen buffer 210 are read out of the buffer and provided, as indicated schematically by arrow 212, to a display adapter 214. The display adapter contains hardware and software (sometimes in the form of firmware) which converts the information in the screen buffer 210 to a form which can be used to drive a display screen 235 of a monitor 232 which is connected to display adapter by cable 218.

In a preferred embodiment, the invention described herein is implemented in an object-oriented dynamic programming language, such as Common Lisp, using object-oriented programming (OOP) techniques. The Common Lisp language is well-known and many articles and texts are available which describe the language in detail. In addition, Common Lisp compilers are available from several vendors. Accordingly, for reasons of clarity, the details of the Common Lisp language and the operation of the Common Lisp compiler will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real world entity in terms of its characteristics, which can be represented by the data elements, and its behavior, which can be represented by its data manipulation functions. In this way, objects can model concrete things like people and computers, while also modeling abstract concepts like numbers or geometrical designs.

Objects are defined by created "classes" which act as templets that instruct the compiler how to construct an actual object. A class may, for example, specify the number and type of data variables and the steps involved in the functions which manipulate the data.

The principle benefits of OOP techniques arise out of three basic principles: encapsulation, polymorphism and inheritance. More specifically, objects can be designed to hide, or encapsulate, all, or a portion of, its internal data structure and internal functions. Polymorphism is a concept which allows objects and functions which have the same overall format, but which work with different data, to function differently in order to produce consistent results. Inheritance on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. The creation of a new subclass which has some of the functionality (with selective modification) of another class allows software developers to easily customize existing code to meet their particular needs.

Figure 3:
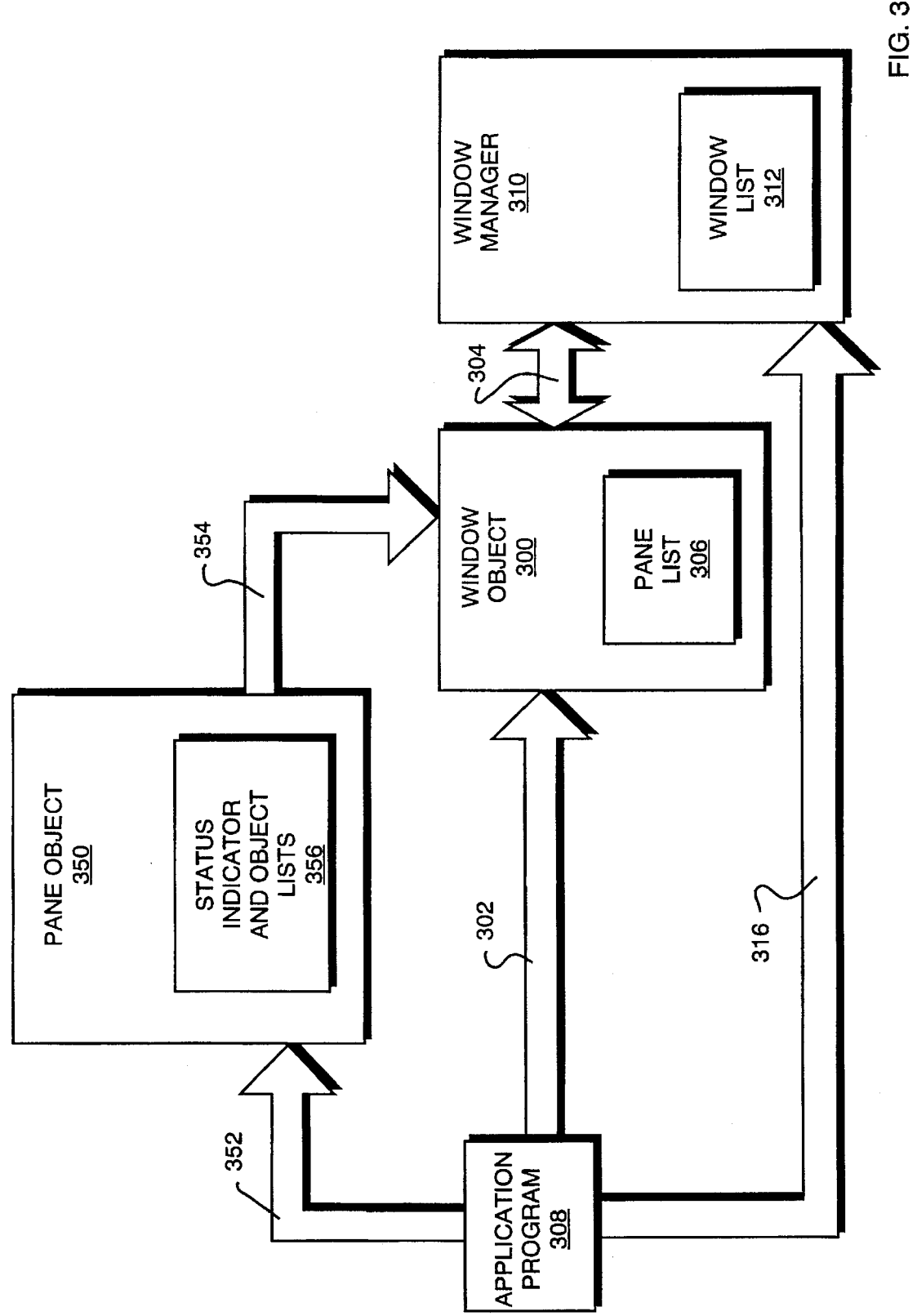
FIG. 3 shows the interaction between an application program and a window manager in accordance with the invention.

In accordance with the invention, the window and its panes are "objects" created by the application program to communicate with the window manager, which is preferably an object-oriented program. The interaction between an application program and a window manager is illustrated in greater detail in FIG. 3.

In general, an application program 308 interfaces with the window manager 310 by creating and manipulating objects. The window manager itself is an object which is created when the operating system is started. Specifically, the application program creates window objects 300 that cause the window manager to create associated windows on the display screen. This is shown schematically by an arrow 302. In addition, the application program 308 creates individual pane objects 350 that are stored in each window object 300, as shown schematically by arrows 352 and 354.

Since many pane objects may be created in order to display many panes on the display screen, the window object 300 communicates with the window manager 310 by means of a sequence of drawing commands issued from the window object 300 to the window manager 310, as illustrated by arrow 304. The application 308 also communicates with the window manager 310 by sending commands to the manager 310, as indicated by arrow 316. The window manager 310 maintains a window list 312 that contains each window currently in the system.

Although object-oriented programming offers significant improvements over other programming concepts, program development still requires significant outlays of time and effort, especially if no preexisting software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such predefined classes and libraries are typically called "application frameworks" and essentially provide a pre-fabricated structure for a working application.

For example, an application framework for a conventional graphical user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending upon the level the system involved and the kind of problem to be solved. The types of frameworks range from high-level application frameworks that assist in developing a user interface, to lower-level frameworks that provide basic system software services such as communications, printing, file system support, graphics, etc. Commercial examples of application frameworks include MacApp (Apple), OWL (Borland), NeXT Step App Kit (NEXT) and Smalltalk-80 MVC (ParcPlace).

While the application framework approach utilizes all the principles of encapsulation, polymorphism and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedure calls.

In the same way that an application framework provides the developer with prefab functionality for an application program, a system framework, such as that included in the preferred embodiment, can provide a prefab functionality for system level services which developers can modify or override to create customized solutions, thereby avoiding the awkward procedure calls necessary with the prior art application flameworks programs. For example, consider a customizable browser flamework which can provide the foundation for browsing and direct manipulation of objects. An application program developer who needed these capabilities would ordinarily have to write specific routines to provide them. To do this with a framework, the programmer only needs to supply the characteristics and behavior to the finished output, while the flamework provides the actual routines which perform the tasks.

A preferred embodiment takes the concept of frameworks and applies it throughout the entire system, including the application and operating system. For the commercial or corporate developer or systems integrator, this means all of the advantages that have been illustrated for a flamework, such as MacApp, can be leveraged not only at the system level for such services as printing, graphics, multi-media, file systems and I/O operations, but also at the application level, for things such as text and, as described herein, graphical user interfaces.

Referring again to FIG. 3, the window object 300 and the pane object 350 are elements an improved graphical user interface having a customizable browser framework for greatly enhancing the ability of a user to navigate or browse through many different objects stored in the memory 114. Specifically, as described further herein, the customizable browser framework classifies and organizes these latter objects as source code entities according to the semantics of the programming language. This type of browser is a particularly useful tool for the programmer that is developing software in a programming environment.

However, during such development, there may be state attributes associated with objects that the programmer would like to examine. These attributes may include whether the source code of an object has been saved or compiled, and the user access status of the code. In accordance with the present invention, the improved graphical user interface includes status indicators relating to these state attributes.

Figure 4:
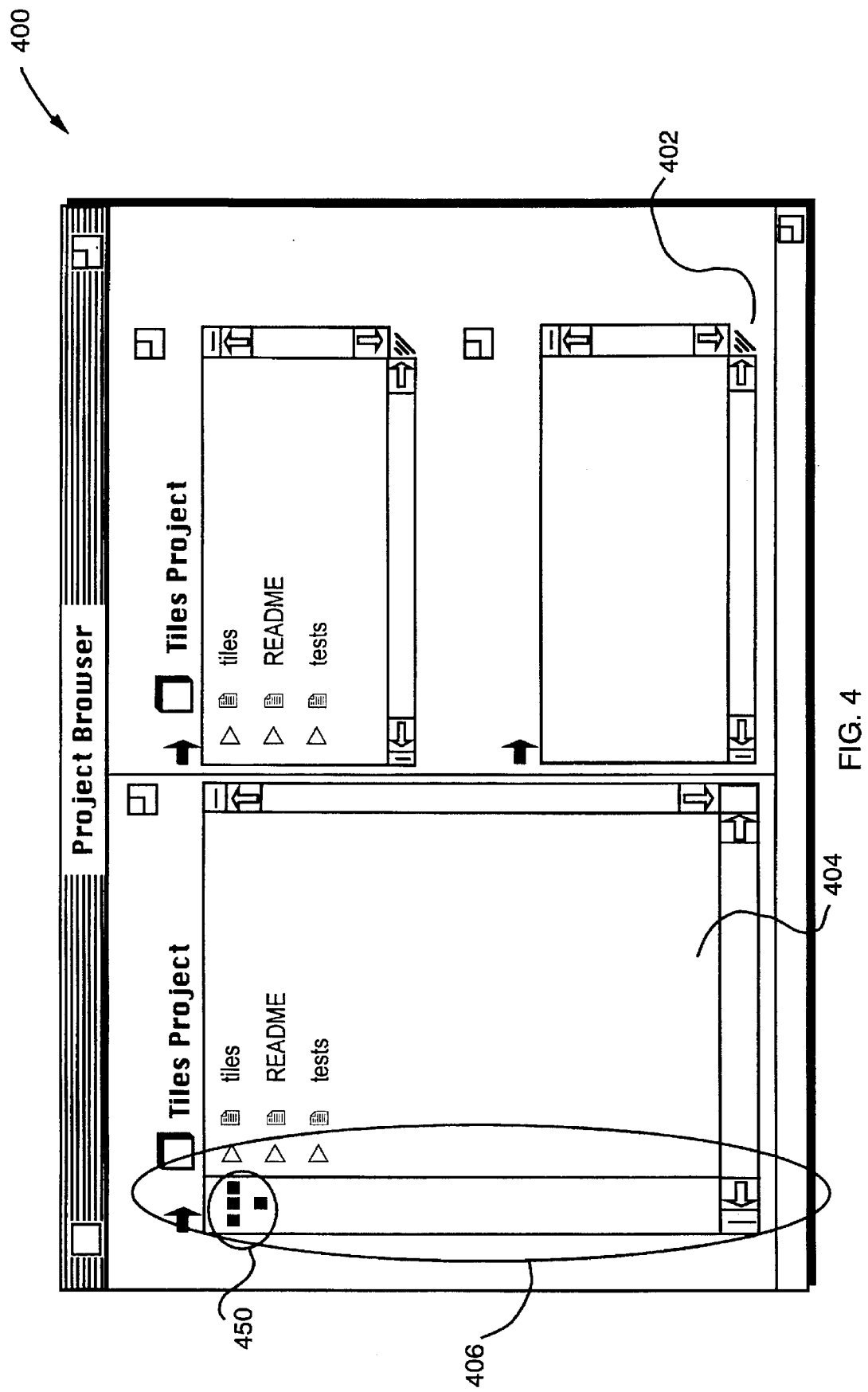
FIG. 4 shows a display screen illustrating novel status indicators in accordance with the invention.

FIG. 4 shows a display screen 400 illustrating the novel status indicators, collectively referred to at 450, which are associated with various objects of a project "Tiles". As can be seen, the indicators are displayed on a pane 404 of a window 402 as distinct visual cues adjacent to their associated objects; specifically, there are three (3) status indicators positioned alongside of the object "tiles" and one (i) indicator located next to the object "README". A novel side panel bar 406 is provided within the pane 404 for displaying these indicators.

According to one aspect of the invention, the status indicators 450 are distinguished from among one other by color, shape and/or relative spatial position along the side bar panel 406. Preferably, each type of indicator described herein has a different color and a different relative location along the width of the panel; however, in the illustrative embodiment, each also has a common rectangular, "blip-like", i.e., simple geometric, shape.

Figure 5:
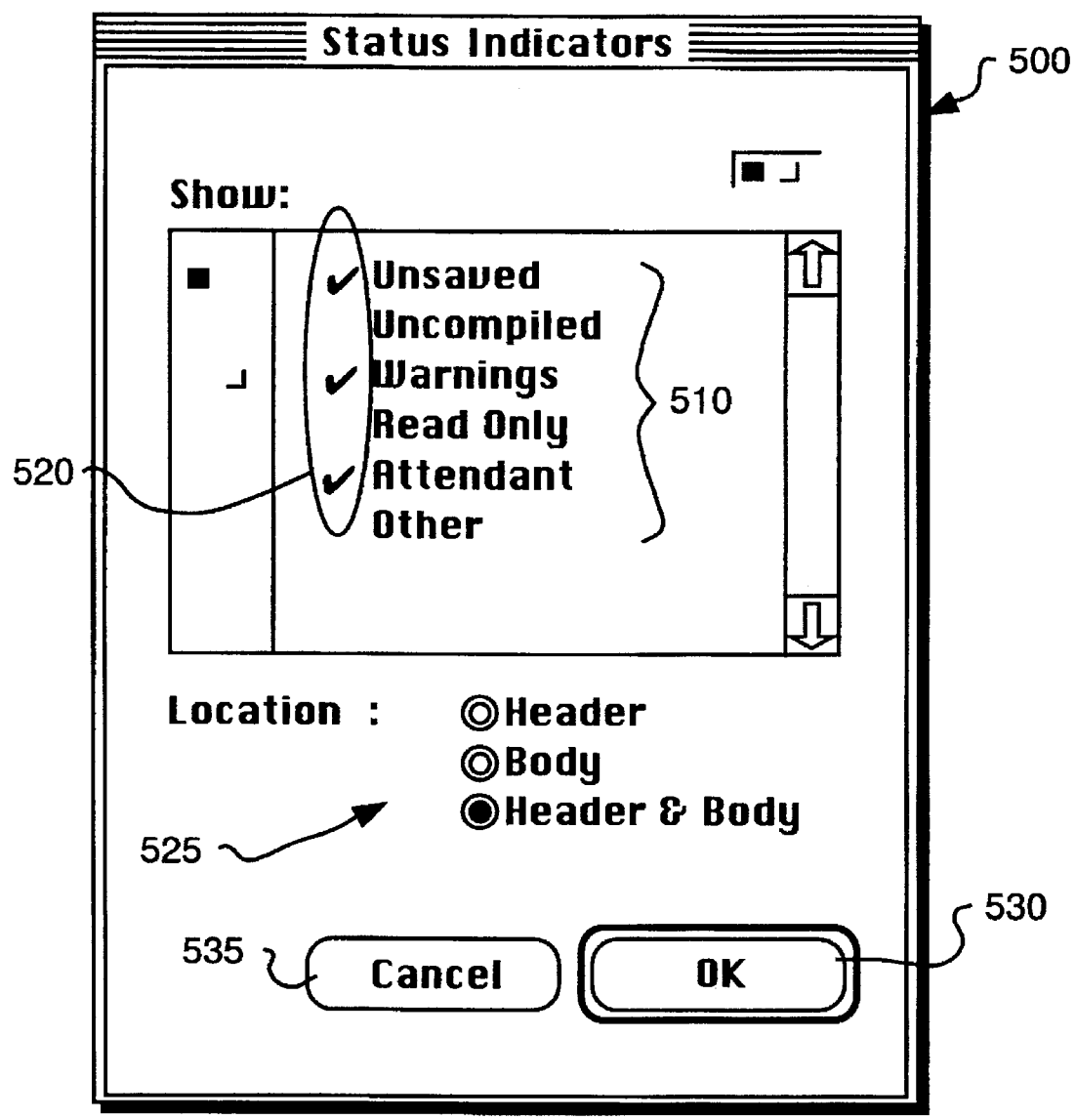
FIG. 5 shows a status indicator dialog box for displaying a list of available status indicator entries in accordance with the invention.

FIG. 5 shows a status indicator dialog box 500 displaying a list of status indicator parameter entries 510 in connection with the present invention. As noted, these entries relate to the status of an object and include such state attributes as: (i) UNSAVED, (ii) UNCOMPILED, (iii) WARNINGS, (iv) READ ONLY, (v) ATTENDANT and (vi) OTHER. Specifically, the object-related attribute represented by the entry UNSAVED indicates that the source code of the object has not been saved since modification; the entry UNCOM- PILED indicates that the object's source code has not yet been compiled; the entry WARNINGS indicates that errors have been detected in the source code; the entry READ-ONLY indicates that the user has only read access (e.g., not write access) to the object's code; and the entry ATTEN-DANT indicates that object's source code is not designated as a runtime object for execution by the computer.

The entry OTHER is a special entry that is only active when one or more status indicators are not displayed. The status indicators that are currently displayed, however, are designated by check marks 520 or other similar inscription adjacent to the indicators. A user may select or deselect any of the available status indicators on the list for display on the screen by, e.g., "clicking" on the indicator entries with a mouse, which toggles the entry's state.

The dialog box 500 is preferably a modal dialog box because it puts the user in "mode" of being able to work only inside the box 500. That is, whether accepting/rejecting the selected/deselected status indicator entries 510, the user must affirm that choice by clicking on either the "OK" button 530, located at the bottom of the box, or the adjacent "Cancel" button 535, prior to issuing any other commands to the application.

In accordance with the invention, the status indicators may appear along any side of a frame of the pane; that is, the indicators may appear in a side bar located on the right or left side of the pane, or they may appear in a title bar arranged along the top side of each pane or, if appropriate, in a bar located along the bottom side of the pane. Preferably, a location pop-up 525 specifies whether these indicators should appear in the right/left side bar, the title bar, in both areas or in neither area. When they appear in the title bar, the status indicators apply to the object that is being displayed in the pane.

The text for each indicator (i)–(vi) is preferably displayed in the color of that indicator. In the illustrative embodiment, the preferred color of the positional cue (and its associated text) for each status indicator is as follows:

| | | |
|---|---|---|
| (i) | UNSAVED | blue |
| (ii) | UNCOMPILED | green |
| (iii) | WARNINGS | orange |
| (iv) | READ ONLY | pink |
| (v) | ATTENDANT | yellow |
| (vi) | OTHER | grey |

The set of status indicators shown is determined on a pane-bypane basis. Accordingly, and referring again to FIG. 3, each pane object 350 created by the application program 308 preferably has an internal data structure 356 containing a list of every status indicator displayed by the dialog box 500, together with the status of each indicator, i.e., selected or unselected. As described in connection with FIG. 5, the status of each indicator is determined by a user manipulating the dialog box 500. In addition, each window object 300 contains a list of panes 306 and each pane object 350 also contains a list of objects. The state of each object displayed in the pane determines whether or not to draw each possible status indicator.

Figure 6A:
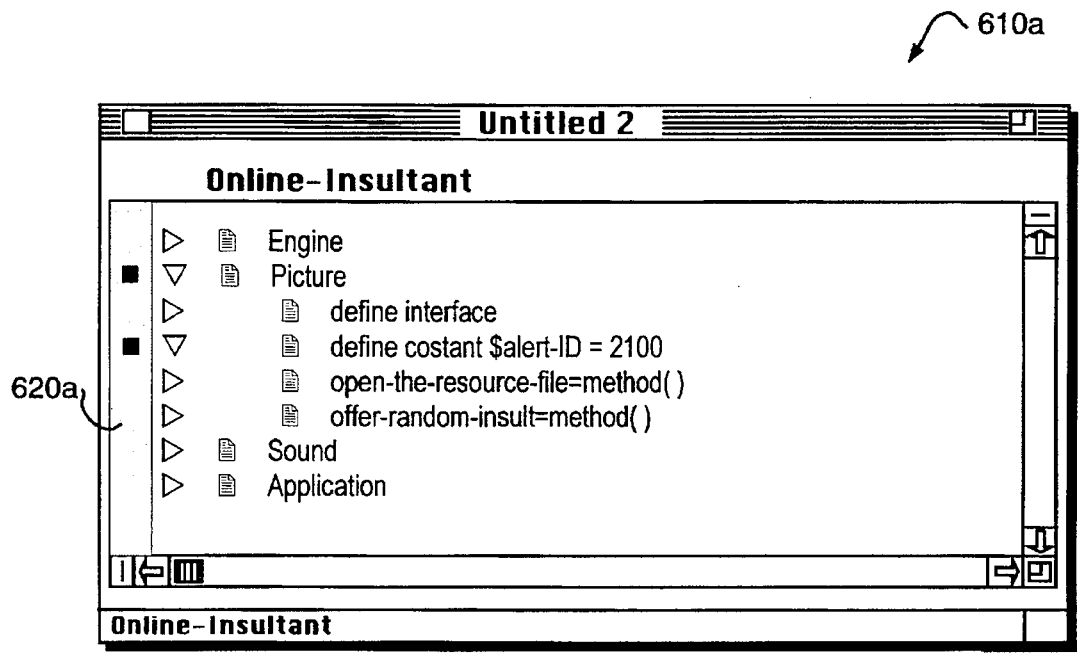
FIGS. 6A and 6B show window panes, each illustrating the dynamically-adjustable side bar panel in accordance with the invention.
Figure 6B:
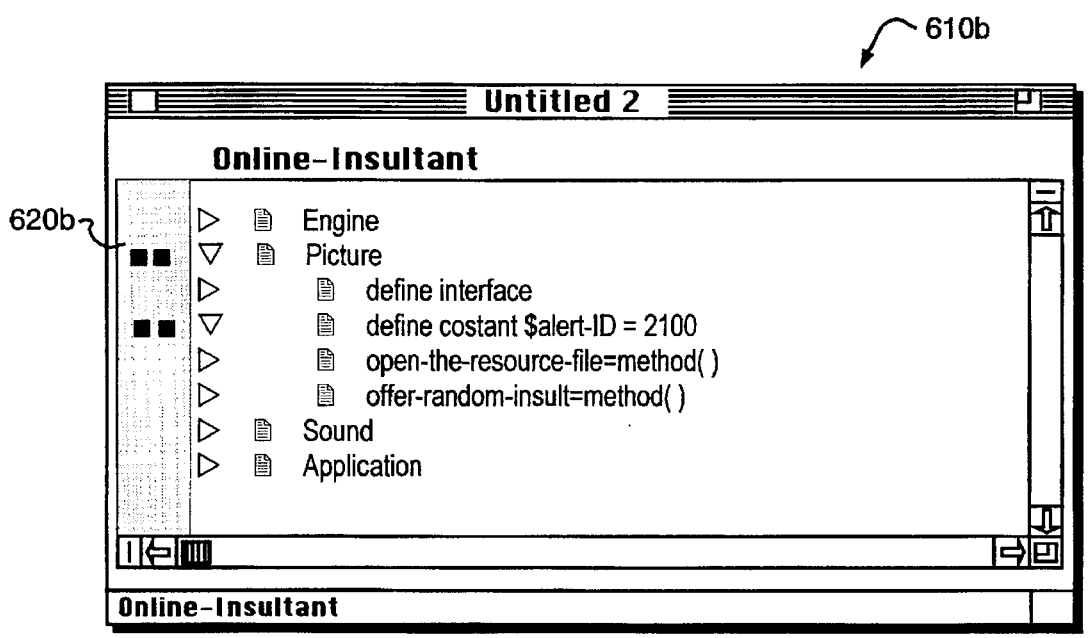

In accordance with another aspect of the invention, the width of the novel side bar panel 406 (FIG. 4) dynamically expands/contracts depending upon the quantity of status indicators chosen for display. FIGS. 6A and 6B show dynamically-adjustable side bar panels 620a,b of panes 610a,b. The dynamically adjustable nature of the side panel 620 allows numerous status indicators to be shown on the panel, if desired, while also conserving screen real estate when only a few indicators are selected for display.

Specifically, each indicator (i)–(vi) appearing in a right/left side bar panel preferably has a relative spacial location along that bar panel that is determined on a pane-by-pane basis by the user depending upon the quantity of indicators chosen for display. For example, if status indicators (i), (ii) and (vi) are selected for display in a particular pane, the width of the side bar panel would consist of three (3) columns, with each column being designated a status indicator. If, on the other hand, the indicators appear in a title (or bottom) bar panel of the pane, each indicator would occupy an analogous spatial "row" of that particular side bar panel that would be determined, again, on a pane-by-pane basis depending upon the number of status indicators chosen for display. That is, the relative spatial positions of indicators are consistent within a pane and unoccupied columns (or rows) are eliminated. It will be apparent to those skilled in the art, however, that other predetermined spacial position configurations of these indicators, such as a diagonal configuration or a fixed-location configuration, may be employed within the teachings of the invention.

As an example of the latter configuration, each indicator (i)–(vi) would have a fixed spacial location along the side bar, with the indicator (i) occupying the first spacial "column" nearest to the border of the pane and the indicator (vi) occupying the last spatial column farthest from that border. If the indicators appear in a title (or bottom) bar panel of the pane, each indicator would occupy an analogous spacial "row" of that particular side bar panel. In accordance with this embodiment, if an indicator (vi) is displayed for any object present in the pane, then the side bar panel will be drawn to its maximum width; however, if only the indicator (i) is displayed for each object in the pane, the width of side bar panel 620 will be minimal.

Figure 7:
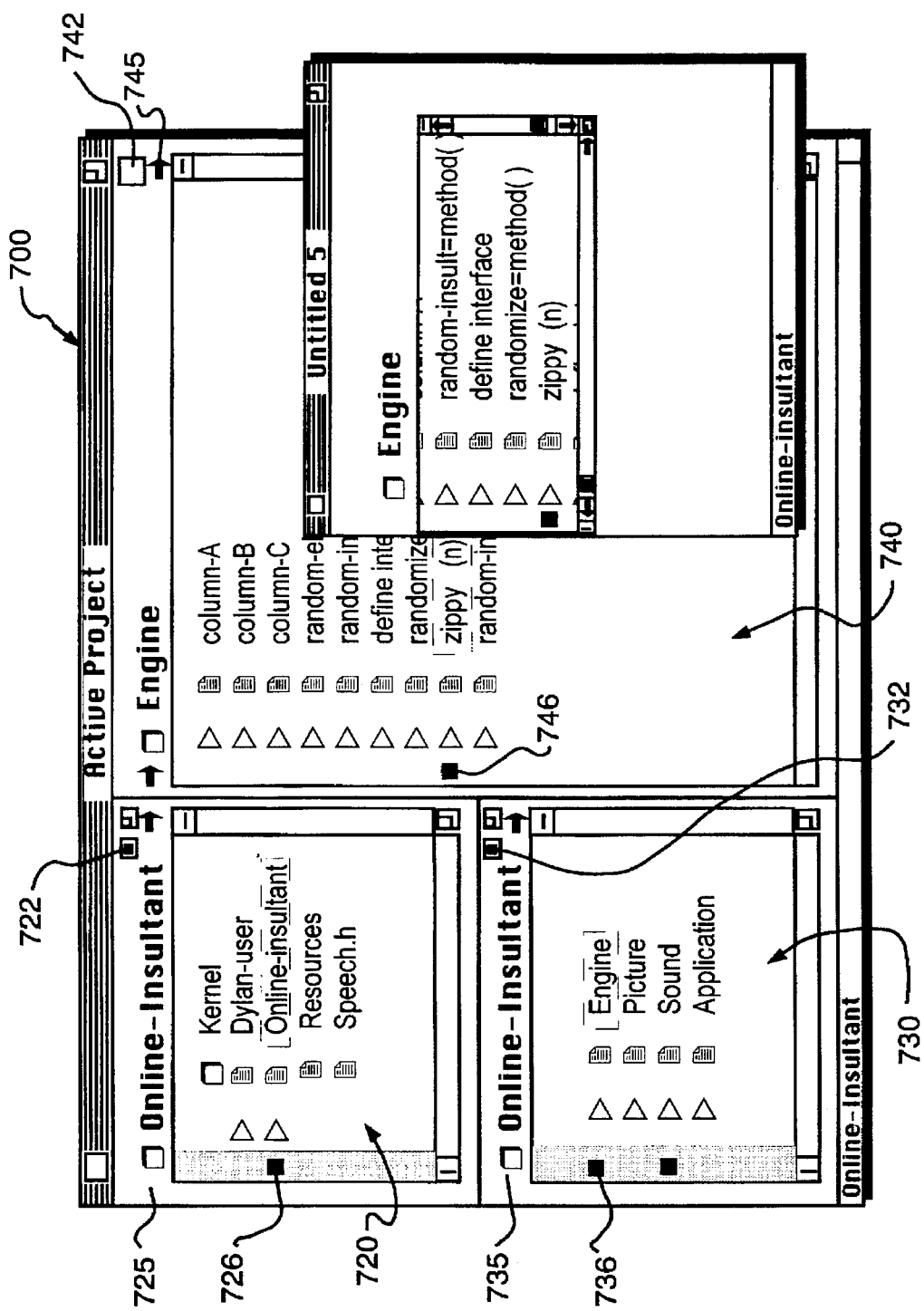
FIG. 7 shows various panes of a window, each of which depicts a level of a containment hierarchy that may advantageously utilize the status indicators of the present invention.

Use of the status indicators of the present invention may be particularly advantageous with respect to the customizable browser framework described herein when used in a programming development environment having a containment hierarchy for developing programs. FIG. 7 shows various panes 720–740 of a window 700, with each pane depicting a level of the containment hierarchy that advantageously utilizes the status indicators of the present invention. Specifically, the containment hierarchy allows source code manipulations and operations, such as "saving" of the code, within the various levels of hierarchy. Here, objects, e.g., functions or class definitions, are units of program source code called "source entities" and comprise the lowest level of the hierarchy. A "source container", resident at the next level, contains an ordered collection of these entities. The source container is analogous to a file and each source entity resides in at least one source container. A module comprises at least one source container and is itself incorporated with an entire project. The project is the center of source code management and contains a working set of source entities.

In FIG. 7, the pane 720 depicts the project level of the containment hierarchy, where various modules of the project "Online-Insultant" are displayed. A status indicator 722 associated with the project Online-Insultant in bar 725 indicates that the project level is the basis of the pane 720. A module "Online-Insultant" is selected and has its contents displayed in pane 730 (the module level of the hierarchy). Status indicator 732 is associated with the module Online-Insultant in the bar 735. Various source containers are displayed in this pane 730, including a selected container "Engine".

Pane 740 shows this source container level "Engine" having a status indicator 742 in bar 745. A selected source entity "zippy" is among the source entities listed in the pane 740. (A pane 750, similar to pane 740, is shown overlapping the pane 740.)

A feature of the present invention is that when a modification is made at, e.g., the source entity level of the project, the status indicators propagate up through the hierarchy to the project level, thereby notifying the programmer that each of those levels require modification. Accordingly, the status indicator 746 (preferably an UNSAVED indicator) is displayed for the source entity "zippy" and indicates that its source code has not been saved. Because "zippy" is contained in source container "Engine", its status indicator 742 is displayed in pane 740, as is status indicator 736 in pane 730. Module "Online-Insultant", comprising source container "Engine", also has its status indicators 732 and 726 displayed in panes 730 and 720, and, lastly, project "Online-Insultant" has its status indicator 722 displayed in pane 720. Such "linking" between the panes 720–740 is made possible because of the contents of the data structure 306 contained in the window object 300 of FIG. 3.

Figure 8:
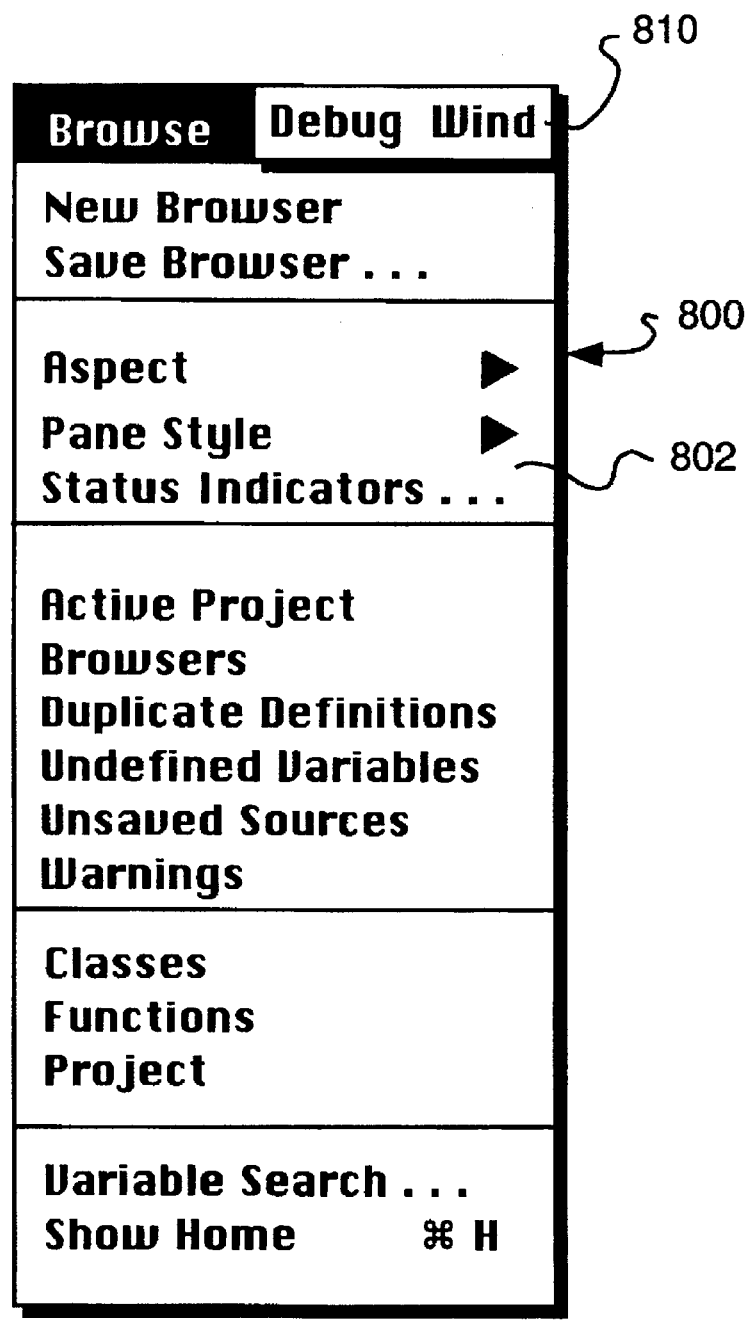
FIG. 8 shows a status indicator group entry on a browse menu in accordance with the invention.

FIG. 8 shows a Status Indicator group entry 802 that is displayed on a Browse menu 800. The Browse menu is preferably a pull-down menu that is available from a menu bar 810. The "Status Indicator" entry 802 is active whenever there is an active pane in the window 820.

Figure 9:
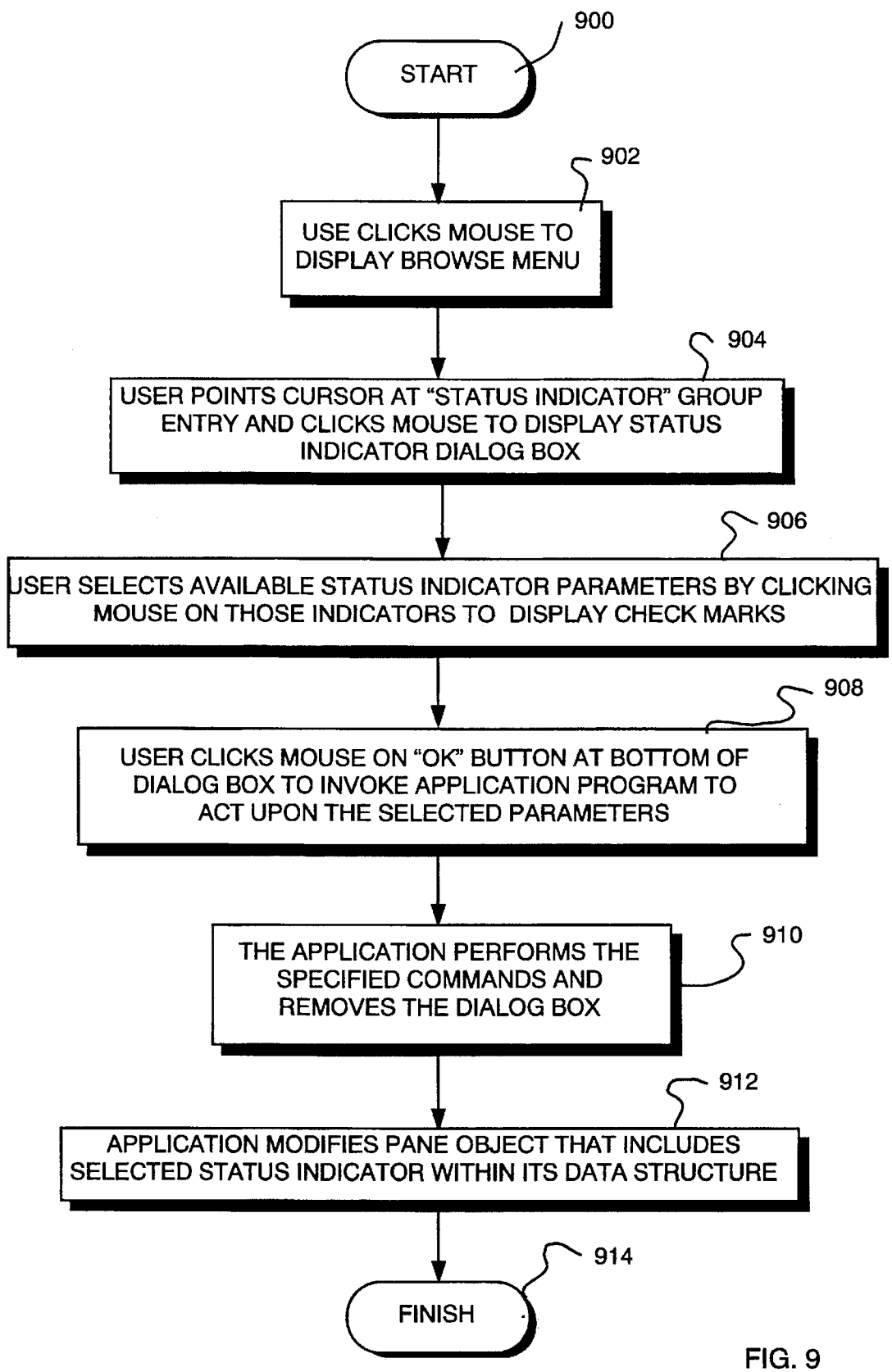
FIG. 9 is an illustrative flow-chart of the sequence of steps involved in operation of the improved graphical user interface when selecting the status indicators of the present invention.

FIGS. 1–8 will now be referenced in connection with sequence of steps illustrated in the flow-chart of FIG. 9 to describe the operation of the improved graphical user interface when selecting the status indicators.

To establish (or change) the status indicators displayed in the side bar panel 620 of an active window pane, the sequence starts in Step 900 and proceeds to Step 902 where a user, operating the mouse 130 to control the cursor 140 on display screen 135, "points" the cursor at the Browse menu 800 of menu bar 810. The user then "clicks" the switch 134 of the mouse to display that menu 800.

In Step 904, the user manipulates the mouse so that the cursor points to the "Status Indicator" group entry 802 on menu 800 and clicks on that entry so as to display the status indicator dialog box 500. As noted, the status indicators portrayed for a particular object are preferably determined on a pane-by-pane basis; accordingly, the selection of indicators made by the user will determine which indicators are displayed in the currently active pane.

In Step 906, the user then selects (or deselects) any of the available status indicators on the list by clicking on those indicator parameter entries. The status indicator parameters selected for display are preferably noted by the presence of check marks 520. The user then clicks the "OK" button 530 at the bottom of the dialog box 500 in Step 908 to invoke the application program 308 to act upon the selected parameters. In response, in Step 910, the application 308 performs the specified command provided by the user and removes the box 500 from the screen. If, however, the user selects the "Cancel" button 535, the application discards any changes issued by the user since the modal dialog box was displayed and then removes the box. The application 308 then modifies a pane object 350 that includes the selected status indicator parameters within the contents of its data structure 356, as indicated in Step 912. The routine then finishes in Step 914.

Figure 10:
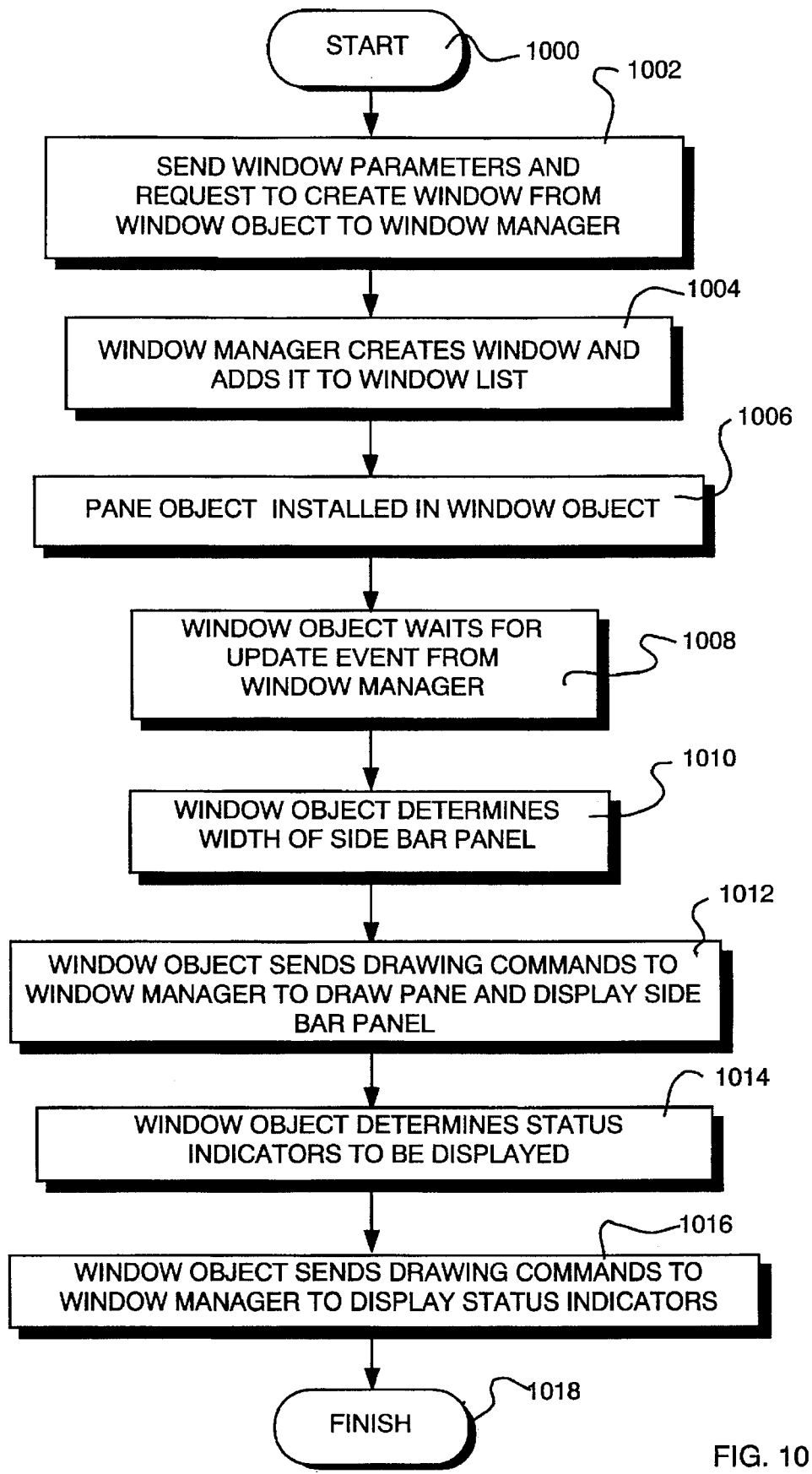
FIG. 10 is an illustrative flow-chart of the sequence of steps used to display a window and associated panes, the panes containing status indicators in accordance with the invention.

As previously noted, a window object and a pane object interact with the window manager to provide various window management functions, such as creating a window and its panes. An illustrative routine used by the application program to display a window and its associated panes, the latter of which contain status indicators, is shown in the flowchart of FIG. 10. The routine starts in Step 1000 and proceeds to Step 1002 in which the parameters defining the window, e.g., its size and interface elements, together with a request to create a new window, are sent (illustrated as arrow 304 in FIG. 3) from the window object to the window manager. In response to this request, the window manager creates a window (Step 1004) and adds the new window to the window list 310. The list of created windows allows the window manager to keep track of the locations and sizes of the windows which must be drawn and redrawn as windows are created and deleted in connection with elements of the improved graphical user interface of the present invention.

In Step 1006, a pane object 350 is installed in the window object 300 and in Step 1008, the window object waits for an update event from the window manager indicating that the window and pane needs to be drawn. The window manager generates such update events to coordinate the display of the windows and panes. Upon receiving the update event, the window object, in Step 1010, determines the width of the side bar panel using a count of status indicator parameters stored in the pane object's list 356 and, in Step 1012, sends appropriate drawing commands to the window manager to draw the pane and display the side bar panel. In step 1014, the window object 300 then determines which status indicators should be shown for each object stored in the data structure 356 of the pane object and, in Step 1016, the window object sends appropriate drawing commands to the window manager to display those status indicators. The routine then finishes in Step 1018.

An advantage of the present invention relates to the use of visual positional status indicators, each having a distinct color, shape and/or spatial position within the side bar panel, to obviate the need for a user to read text associated with each indicator. This is particularly significant for a programmer that may be interested in the status of various objects during software development in a programming environment. By eliminating the need to read text to determine the status of these objects, the programmer can merely glance at the visual cues and off-load interpretation of their states to the sub-conscience, thereby eliminating time consuming and inefficient computer-related commands.

While there has been shown and described an illustrative embodiment for manifesting status indicators on a window pane as distinct visual cues within a program development environment, it is to be understood that various other adaptations and modifications may be made within the spirit and scope of the invention. For example, the invention is also applicable to a relational database environment where users have a need to share records. In this embodiment of the invention, a user may scan through records of the database and retrieve a record on a screen for editing purposes. Prior to initiating the edit, the status indicators described herein may be configured to propagate onto all screens of users accessing the database to inform them of the record access. Here, the status indicators may be distinguished from among one another by shape, e.g., squares, triangles, circles, etc. In another embodiment, these status indicators may be employed in a networked development environment as a source code control mechanism to govern access to particular files.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An improved graphical user interface of a computer system having a display monitor for displaying a cursor on a display screen, said screen having associated therewith a device for controlling said cursor, said interface comprising:

a window of said screen, said window configured for apportionment into at least one pane for displaying objects of said system; and status indicator means for positionally displaying state attributes associated with said objects, said status indicator means being displayed on a side bar panel of said pane, said side bar panel having a dynamically-adjustable width configured to one of expand and contract in response to the quantity of said state attributes selected for display.

2. The improved graphical user interface of claim 1 wherein said status indicator means comprises distinct visual cues.

3. The improved graphical user interface of claim 2 wherein said visual cues are distinguished from among one other by shape.

4. The improved graphical user interface of claim 2 wherein said visual cues are distinguished from among one other by color.

5. The improved graphical user interface of claim 4 further comprising means for setting said status indicator means to display selected ones of said visual cues.

6. The improved graphical user interface of claim 5 wherein said status indicator setting means comprises a status indicator dialog box element displayed on said display screen, the user manipulating said cursor controlled device to select one of a plurality of status indicator parameter entries displayed on said dialog box element.

7. The improved graphical user interface of claim 6 wherein said visual cues are distinguished from among one other by relative spacial position along said dynamically-adjustable side bar panel.

8. A computer system having an improved graphical user interface for enhancing the ability of a user to interact with said system, said computer system including a display monitor for displaying a cursor on a display screen having associated therewith a device for controlling said cursor, said computer system comprising:

a processor;

an operating system cooperating with said processor to control said display screen;

a window manager object created by said operating system, said window manager object drawing a pane for display on said display screen; an application program for generating source entity objects for display on said pane; and user interface element means for positionally displaying state attributes associated with said source entity objects, said user interface means being displayed on a side bar panel of said pane, said side bar panel having a dynamically-adjustable width configured to one of expand and contract in response to the quantity of said state attributes selected for display.

9. The computer system of claim 8 wherein said user interface element means comprises status indicators having a blip-like shape and being distinguished from among other status indicators by color.

10. The computer system of claim 8 wherein said user interface element means comprises status indicators having a blip-like shape and being distinguished from among other status indicators by relative spacial position along said dynamically-adjustable side bar panel.

11. The computer system of claim 10 wherein said user interface element means further comprises a status indicator dialog box element for setting said status indicators in response to the user manipulating said cursor controlled device to select one of a plurality of status indicator parameter entries displayed on said dialog box element.

12. The computer system of claim 11 further comprising a window object created by said application program, said window Object communicating with said window manager object by issuing a sequence of drawing commands to display said pane.

13. The computer system of claim 12 further comprising a pane object created by said application program and stored in said window object, said pane object having an internal data structure containing a list of said selected status indicator parameter entries.

14. A method for enhancing the ability of a user to interact with a computer system having an improved graphical user interface, said computer including a display monitor for displaying a cursor on a display screen having associated therewith a device for controlling said cursor, said method comprising the steps of:

creating a window manager object from an operating system of said computer;

drawing a pane for display on said display screen using said window manager object;

generating source entity objects for display on said pane with an application program;

selecting status indicator parameters from a status indicator dialog box element of said improved graphical user interface displayed on said display screen in response to the user manipulating said cursor controlled device, said status indicator parameters positionally displaying state attributes associated with said source entity objects on a dynamically-adjustable side bar panel of said pane; and one of expanding and contracting a width of said dynamicallyadjustable side bar panel in response to the quantity of said status indicator parameters selected for display.

15. The method of claim 14 further comprising the steps of:

creating a window object from said application program;

issuing a sequence of drawing commands from said window object to said window manager object; and displaying said pane in response to said drawing commands.

16. The method of claim 15 further comprising the steps of:

creating a pane object from said application program;

storing said selected status indicator parameters in a list of an internal data structure of said pane object;

storing said pane object in said window object; and sending said status indicator parameters to said window manager object when displaying said pane.

* * * * *

UNITED STATES PATENT AND TRADEMARK OFFICE
CERTIFICATE OF CORRECTION

PATENT NO. : 5,644,334
DATED : July 1, 1997
INVENTOR(S) : Jones et al.

It is certified that error appears in the above-identified patent and that said Letters Patent is hereby corrected as shown below:

In the claims:

Claim 12, column 14, line 14, "Object" should read --object--.
Claim 14, column 14, line 46, "dynamically adjustable" should read --dynamically-adjustable--.

Signed and Sealed this

Twenty-ninth Day of August, 2000

Attest:

Q. TODD DICKINSON

Attesting Officer

Director of Patents and Trademarks